(12) United States Patent
Osada et al.

(10) Patent No.: US 6,346,752 B1
(45) Date of Patent: Feb. 12, 2002

(54) ELECTROMAGNETIC RETARDER WITH A BUILT-IN EXCITER

(76) Inventors: Masahiro Osada; Ryuji Rouyama; Eiichi Furuse, all of c/o Sawafuji Electric Co., Ltd., Nitta Kojyo, No-3 Aza Hayakawa, Ohaza Hayakawa, Nitta-machi, Nitta-gun, Gunma-ken (JP)

( * ) Notice: Subject to any disclaimer, the term of this patent is extended or adjusted under 35 U.S.C. 154(b) by 0 days.

(21) Appl. No.: 09/459,663

(22) Filed: Dec. 13, 1999

(30) Foreign Application Priority Data

Dec. 22, 1998 (JP) .............................. 10-364084

(51) Int. Cl.[7] .......................... H02K 1/04; H02K 49/00; H02K 23/60
(52) U.S. Cl. .............................. 310/43; 310/124; 310/92
(58) Field of Search .................... 310/43, 103, 105, 310/124, 108, 42, 112, 45, 113, 46, 114, 48, 115, 52, 66, 125, 67 V, 126, 68 V, 152, 71, 171, 74, 179, 75 V, 180, 77, 181, 79, 182, 80, 194, 85, 210, 88, 211, 92, 214, 93, 216, 94, 218, 95, 254, 96, 97, 102 R, 102 Q, 107

(56) References Cited

U.S. PATENT DOCUMENTS 4,563,606 A * 1/1986 Fukasawa et al. .......... 310/208
4,568,862 A * 2/1986 Tassinario .................... 318/254
4,835,839 A * 6/1989 Forbes et al. .................. 29/596
5,698,923 A * 12/1997 Scherzinger et al. ........ 310/194
5,937,508 A * 8/1999 Shiga ........................... 29/598
5,975,234 A * 11/1999 Bugosh et al. ............... 180/444

FOREIGN PATENT DOCUMENTS

JP         410225096 A    *   8/1998

* cited by examiner

Primary Examiner—Nestor Ramirez
Assistant Examiner—Guillermo Perez
(74) Attorney, Agent, or Firm—McGlew and Tuttle, P.C.

(57) ABSTRACT

An electromagnetic retarder apparatus with a built-in exciter having a retarder exciter inside thereof for generating braking torque by an eddy current produced in an eddy-current cylinder as a plurality of magnetic poles that are alternately magnetized to N and S poles by a field current caused to flow by a voltage generated in the exciter are caused to rotate in a relation to the eddy-current cylinder disposed at a location facing the magnetic poles; the eddy-current cylinder comprises a core formed by laminating a magnetic material, and short-circuiting method provided on the laminated core in the axial direction thereof for causing the generated eddy current to flow therein.

5 Claims, 13 Drawing Sheets

ELECTROMAGNETIC RETARDER WITH A BUILT-IN EXCITER

BACKGROUND OF THE INVENTION

1. Field of the Invention

The present invention relates to an electromagnetic retarder with a built-in exciter, and more specifically to an electromagnetic retarder with a built-in exciter having such a construction that an eddy-current cylinder for generating braking torque by eddy current is formed by laminating a magnetic material, and an exciter core divided into a plurality of segments is used as the exciter.

2. Description of the Prior Art

FIG. 19 is a longitudinal sectional diagram illustrating the essential part of an electromagnetic retarder with a built-in exciter of a conventional type, viewed in the direction of arrows AOB of FIG. 20. FIG. 20 is a right-hand side view of FIG. 19.

In FIGS. 19 and 20, a support disc 1 that is of a dish- or cup-shape on both sides thereof is rotatably provided between a flange 2-1 on the side of the output-shaft of a transmission 2 and a flange 3-1 on the side of a propeller-shaft 3, as shown in FIG. 19. The support disc 1 is formed into a shape of an open-ended dish or cup by flange members on both sides of the rim thereof, and coaxially fitted between the flange 2-1 on the side of the output shaft and the flange 3-1 on the side of the propeller shaft 3 with bolts 4 and nuts 5.

An eddy-current cylinder 7 is disposed coaxially with the support disc 1 via a mounting disc 6 outside the support disc 1. The eddy-current cylinder 7 is made of an iron material. In some cases, the mounting disc 6 may be formed integrally with the eddy-current cylinder 7.

A cylindrical support member 8 made of a magnetic material is disposed in a space formed by the outside of the support disc 1 having on both side thereof members formed into an open-end disc or cup shape, and the eddy-current cylinder 7. One end of the cylindrical support member 8 is fixedly fitted to a support plate 9 having a recess at the center thereof. The support plate 9 is fixedly fitted to an end of the transmission 2 with bolts 10. In this case, too, the support plate 9 may be formed integrally with the support member 8.

A pole core 11 made of a magnetic material is fitted with bolts 12 to the outer circumferential surface of the cylindrical support member 8 disposed in a space formed by the outside of the support disc 1 having on both side thereof members formed into an open-end disc or cup shape, and the eddy-current cylinder 7. An air gap is formed between the pole core 11 and the inner circumferential surface of the eddy-current cylinder 7. A field coil 13 is wound on the pole core 11. An exciter core 14 is fixedly fitted to the inner circumferential surface of the support member 8, and an exciter coil 15 is wound on a slot provided on the exciter core 14.

On the outer circumferential surface of the support disc 1 having on both sides thereof members formed into an open-end dish- or cup-shape, provided at equal intervals are permanent magnets 16 formed into an arc-segment shape, for example, arranged in alternately different polarities. An air gap is formed between the permanent magnet 16 and the exciter core 14. The exciter coil 15 wound on the exciter cores 14 and the permanent magnets 16 constitute an exciter.

The a-c voltage generated in the exciter coil 15 is rectified by rectifying means, and a field current flows in the field coil 13 by turning on a retarder main switch.

Numeral 17 refers to a heat shield plate for shielding the radiant heat from the eddy-current cylinder 7 caused by the heat as an eddy-current loss to inhibit temperature rise in the field coil 13. Numeral 18 refers to a radiating fin for dissipating the heat generated in the eddy-current cylinder 7 as an eddy-current loss into the atmosphere.

The operation of the conventional type of the retarder with a built-in exciter having the aforementioned construction will be described in the following.

As the output shaft, that is, the flange 2-1 on the side of the output shaft of the transmission 2 is rotated, the support disc 1, the permanent magnet 16, the mounting disc 6 and the eddy-current cylinder 7 are also rotated en bloc. At this time, the rotation is also transmitted to the flange 3-1 on the side of the propeller shaft 3.

By turning on the retarder main switch to activate the retarder, a d-c voltage obtained by rectifying the a-c voltage generated in the exciter coil 15 is applied to the field coil 13 to cause a field current to flow. As a result, the pole core 11 is magnetized to N and S poles alternately, and an eddy current is produced in the eddy-current cylinder 7. A braking torque is generated in the direction opposite to the rotation of the eddy-current cylinder 7 between the eddy current and the field formed by the pole core 11, applying a braking action to the rotation of the flange 2-1 on the side of the output shaft.

FIG. 21 is a front view of the eddy-current cylinder of the conventional type in which the mounting disc and the eddy-current cylinder are formed integrally, FIG. 22 is a partial cross-sectional view of the side part of FIG. 21. In the figures, the eddy-current cylinder 39 is made of a magnetic material, such as iron, has inclined radiating fins 40 on the outer circumferential surface thereof, and is equivalent to the mounting disc 6 and the eddy-current cylinder 7 described in FIGS. 19 and 20. The outside and inside diameters of the eddy-current cylinder 39 are Lo and Lr, respectively, and the thickness of the core (equal to the thickness of the eddy-current cylinder 7 in FIG. 19) is t2, as shown in FIG. 22.

However, the fins of the eddy-current cylinder 7 and the eddy-current cylinder 39, the radiating fin 18, and the inclined radiating fin 40 shown in FIGS. 21 and 22 as used in the electromagnetic retarder with a built-in exciter of the conventional type shown in FIGS. 19 and 20 have been machined with a gear hobbing machine after machined with a lathe.

The conventional manufacturing method for manufacturing the eddy-current cylinders 7 and 39 having the radiating fins 18 and the inclined radiating fins 40 has had low manufacturing yield, and involved long hours for machining the radiating fins 18 and the inclined radiating fins 40, leading to increased manufacturing cost.

Furthermore, the conventional type of the electromagnetic retarder with a built-in exciter requires splash-proof specifications to prevent water splashes during the travel of a truck from falling on the retarder, lowering the insulation of the exciter. Although there can be a method of covering the exciter coil and other parts with resin, etc. after assembly with the conventional type of the electromagnetic retarder with a built-in exciter, this method could lead to lowered productivity. To cope with this, a method of dividing the exciter core into sections, providing water-proofing measures to each section and assembling the water-proofed sections into one piece has been proposed. This method also has the risk of increasing magnetic resistance, adversely affecting the performance.

SUMMARY OF THE INVENTION

It is an object of the present invention to provide an eddy-current cylinder for electromagnetic retarders having such a construction that braking torque characteristics are improved and the manufacture of eddy-current cylinders is made easy, thereby manufacturing cost is reduced, by producing a core by laminating a magnetic material, and providing short-circuiting means allowing eddy current to flow therein in the axial direction of the eddy-current cylinder.

It is another object of the present invention to provide an exciter for electromagnetic retarders having such a construction that water proofness is imparted to the exciter coil of the retarder, and an exciter core is divided into a plurality of pieces to facilitate the assembling of the retarder with a built-in exciter while preventing the exciter performance from deteriorating due to the division of the exciter core.

It is a further object of the present invention to provide an electromagnetic retarder with a built-in exciter having the aforementioned eddy-current cylinder and exciter for the retarder.

In disclosed embodiments, the eddy-current cylinder comprises a core formed by laminating a magnetic material, and short-circuiting means provided in the laminated core in the axial direction of the cylinder for allowing the generated eddy current to flow therein. The retarder exciter comprises an exciter coil wound on bobbins disposed on the outside thereof facing a plurality of permanent magnets via an air gap, cylindrical exciter cores molded by a molding material together with the bobbins and the exciter coil, cylindrical pole cores provided integrally with the exciter cores on the outer periphery of the exciter cores and having field coils and a plurality of magnetic poles alternately magnetized to N and S poles by a field current caused to flow in the field coils by a voltage generated in the exciter coil, and an eddy-current cylinder provided outside the pole cores facing the pole-core magnetic poles via an air gap; the cylindrical exciter cores molded by a molding material together with the bobbins and the exciter coil being divided into a plurality of pieces to form molded exciter cores; the molded shape of both ends of the divided molded exciter core pieces is such that the overhanging part of the molding material above the bobbins is tapered toward the ends of the molder exciter core with respect to the inside diameter surface of the molded exciter core, with the corner part thereof at both ends being chamfered and the amount of overhand being gradually decreased; the end faces at both ends of each of the divided molded exciter core pieces being formed in such a state that the exciter core surface protrudes from the molded surface; the molded shape of the groove width portion at the exciter coil insertion hole of the bobbin of the molded exciter core has such a construction that the overhang portion of the molding material above the bobbin is tapered toward the center of said groove width with respect to the inside diameter surface of the molded exciter core; with the amount of overhang being gradually decreased; both ends of said exciter coil wound on said molded exciter core are drawn through holes on a collar, of a shouldered embedded construction, mounted on a collar mount protruding from the outer circumferential surface of said molded exciter core in the axial direction; areas around the embedded part of said collar being molded by a molding material.

DETAILED DESCRIPTION OF PREFERRED EMBODIMENTS

Figure 1:
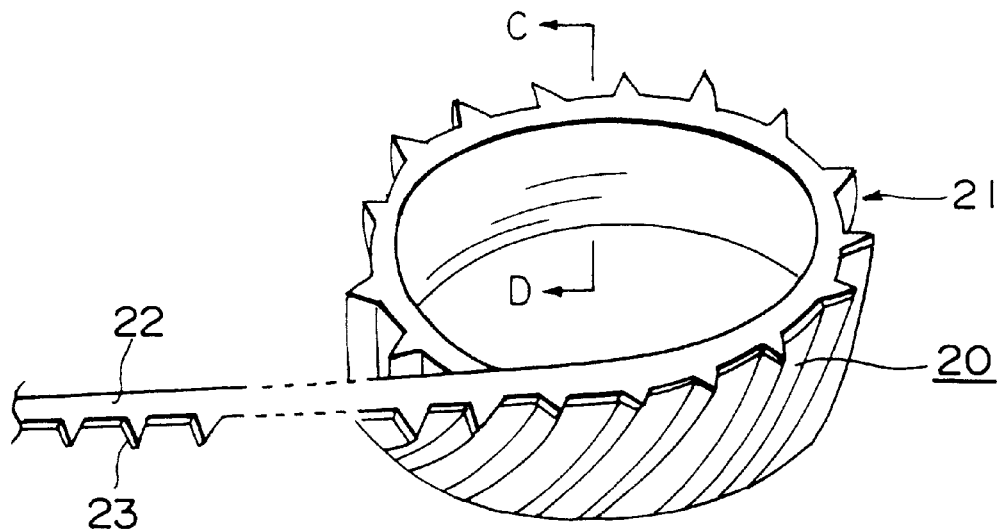
FIG. 1 is a diagram of assistance in explaining a method for manufacturing an eddy-current cylinder according to the present invention.

FIG. 1 is a diagram of assistance in explaining the method for manufacturing an eddy-current cylinder embodying the present invention.

In the figure, an eddy-current cylinder 20 is formed by helically winding a continuously stamped strip of core 22 of a predetermined shape to a predetermined number of layers. The core 22 is made of a continuously stamped strip of a magnetic material, such as silicon or electrical steel, with the one side edge thereof having projections 23 that form radiating fins 21 when helically wound, and the other side edge thereof formed into a straight line or a partially notched straight line. The continuously stamped strip of the core 22 is helically wound around a cylindrical core jig (not shown), for example, with the straight-line side edge thereof facing inward, to form an eddy-current cylinder 20 with radiating fins 21.

The inside diameter of the core 22 at this time is a size of a helix formed by the helically wound core 22, and needless to say, the core 22 is formed by helically winding a continuous strip of a magnetic material. The radiating fins 21 may be formed into a shape of vertical parallel lines, instead of a shape of inclined parallel lines, as shown in FIG. 1.

Figure 2A:
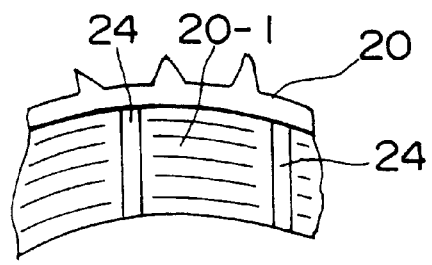
FIG. 2 is a diagram of a part of the eddy-current cylinder of assistance in explaining various eddy-current short-circuiting methods for allowing the eddy current of the eddy-current cylinder to flow therein.
Figure 2B:
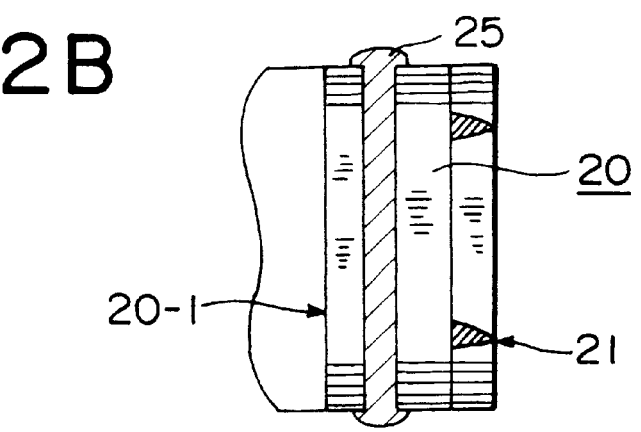

FIG. 2 is a diagram of a part of the eddy-current cylinder to explain various eddy-current short-circuiting methods.

Figure 5:
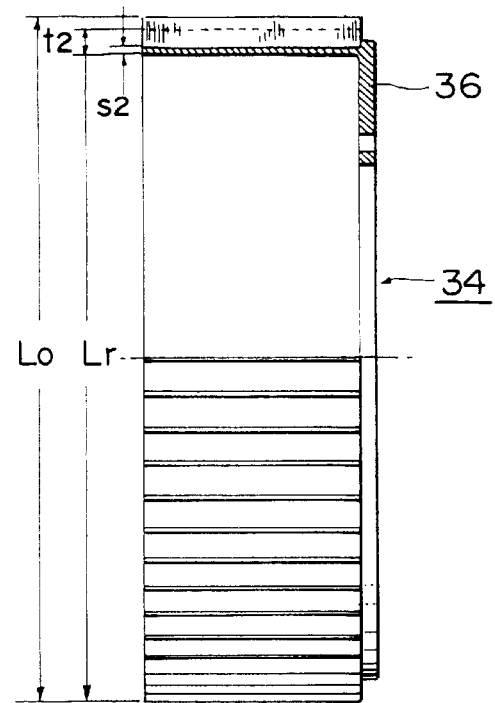
FIG. 5 is a partial cross-sectional view of the side part of FIG. 4.

The eddy-current short-circuiting method using the eddy-current cylinder shown in FIG. 2 (A) is such that short-circuiting means for short-circuiting each layer of the core 22 are provided on the inside diameter surface 20-1 of the eddy-current cylinder 20 in the axial direction thereof, for example, by forming a plurality of current carrying parts 24 on the inside diameter surface 20-1 of the eddy-current cylinder 20 in the axial direction of the eddy-current cylinder 20 to electrically short-circuiting each layer of the core 22. Means for electrically short-circuiting the inside diameter surface 20-1 of each layer of the core 22 include peeling the oxide film on the current carrying parts 24 of the core 22, partially plating the current carrying parts 24 of the core 22, metal spraying the current carrying parts 24 of the core 22, forming weld beads on the current carrying parts 24 of the core 22 by welding, etc. In addition, there can be a method of fixedly fitting a thin cylinder made of an iron material to the entire inside diameter surface 20-1 formed by each layer of the core 22 of the eddy-current cylinder 20, as shown in FIG. 5, which will be described later.

The eddy-current short-circuiting method of the eddy-current cylinder 20 shown in FIG. 2 (B) is such that short-circuiting means for short-circuiting each layer are provided on the part of the eddy-current cylinder 20 corresponding to the core 22, for example, by using a plurality of rivets 25, made of an electrically conductive material, such as iron, copper, aluminum, etc. Holes are provided on the core 22 in the axial direction of the eddy-current cylinder 20, that is, in the direction shown by arrows C–D of FIG. 1, for example, and rivets 25 are inserted into the holes and upsetting the rivets in the holes to form an electrically short-circuited loop.

The short-circuiting means provided on the eddy-current cylinder 20 may be of such a construction that a short-circuiting circuit of a cage type, for example, is formed to allow the eddy current generated in the eddy-current cylinder 20 to flow therein, and need not short-circuit all the layers of the core 22.

Figure 19:
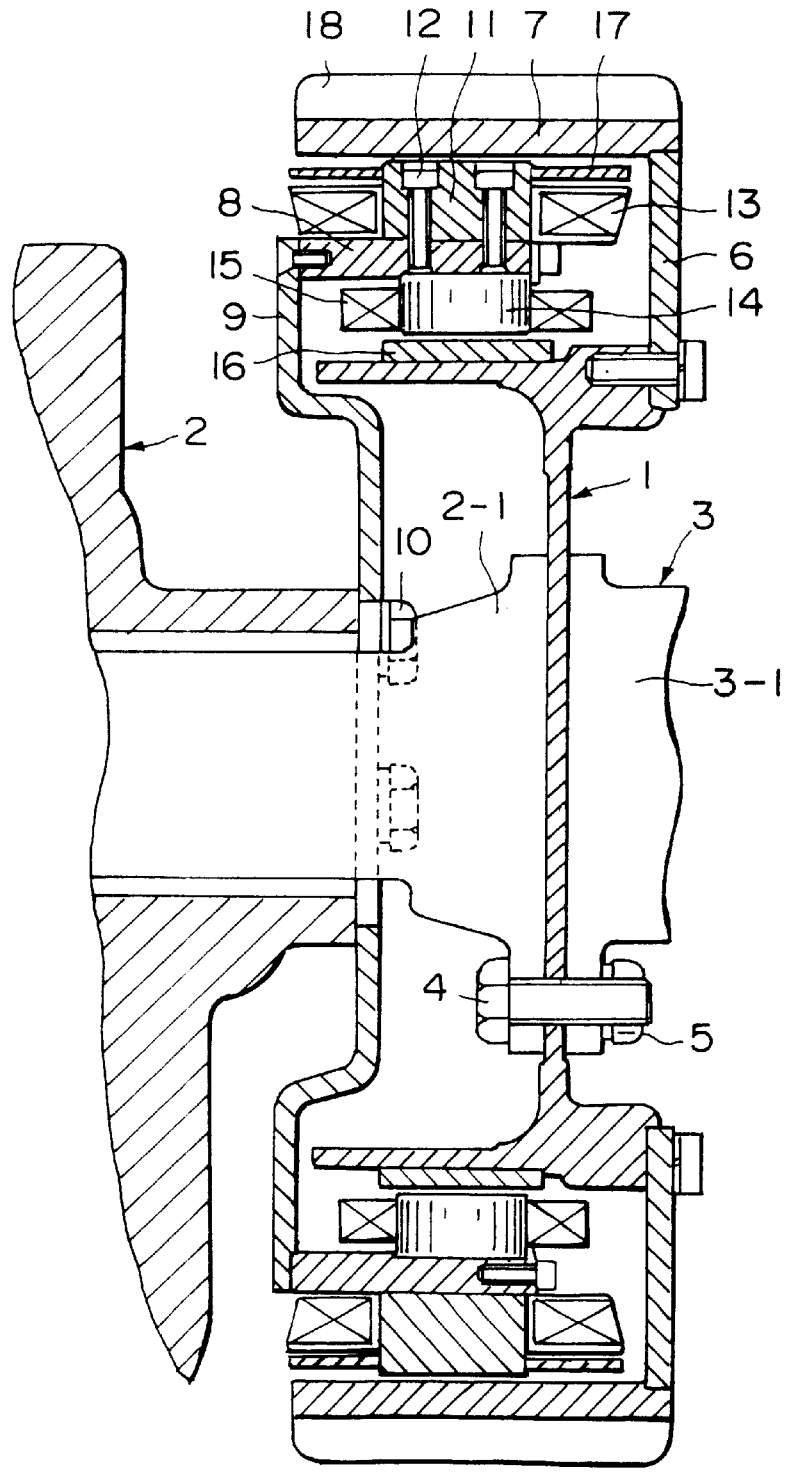
FIG. 19 is a longitudinal sectional view of the essential part of the electromagnetic retarder with a built-in exciter of the conventional type, viewed in the direction shown by the arrows AOB of FIG. 20.
Figure 20:
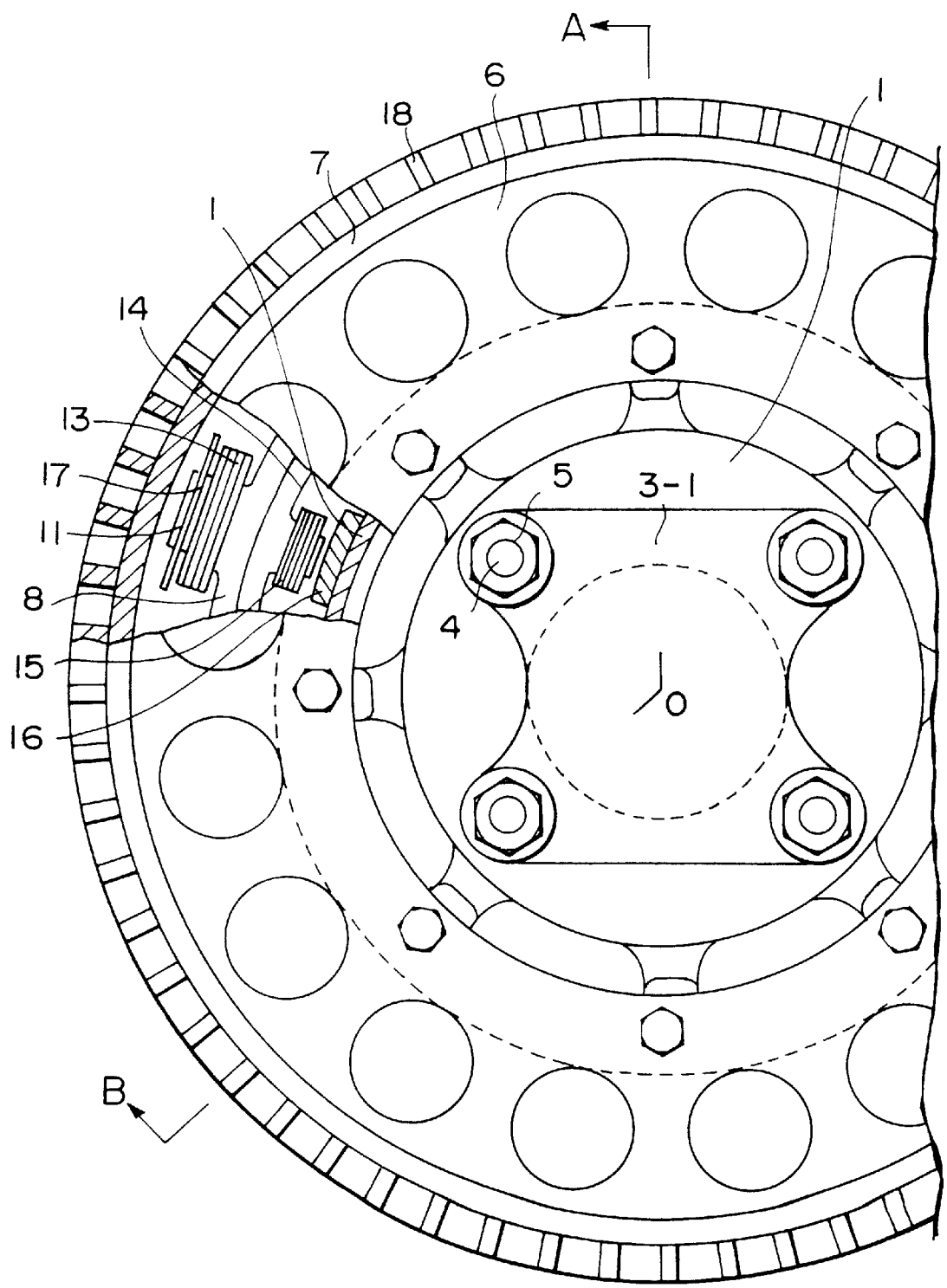
FIG. 20 is a right-hand side view of FIG. 19.
Figure 21:
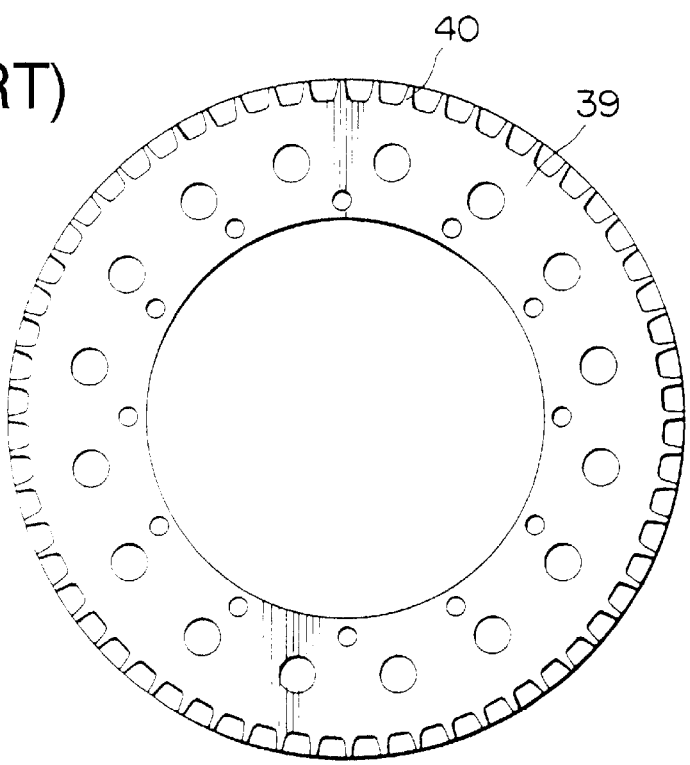
FIG. 21 is a front view of the eddy-current cylinder of the conventional type in which the mounting disc and the eddy-current cylinder are formed integrally.

An eddy-current cylinder 20 having good manufacturing yield, improved workability and therefore reduced manufacturing cost, formed by helically winding a continuous stamped strip of core 22 of a shape shown in FIG. 1 can be used in place of conventional types of eddy-current cylinders 7 shown in FIGS. 19 and 20.

By using an eddy-current cylinder 20 according to the present invention, braking torque can be improved since a-c magnetic resistance is reduced by the laminated core 22, and the eddy current can be increased as the eddy current flows in a short-circuiting circuit formed by short-circuiting means provided on the eddy-current cylinder 20.

Figure 3:
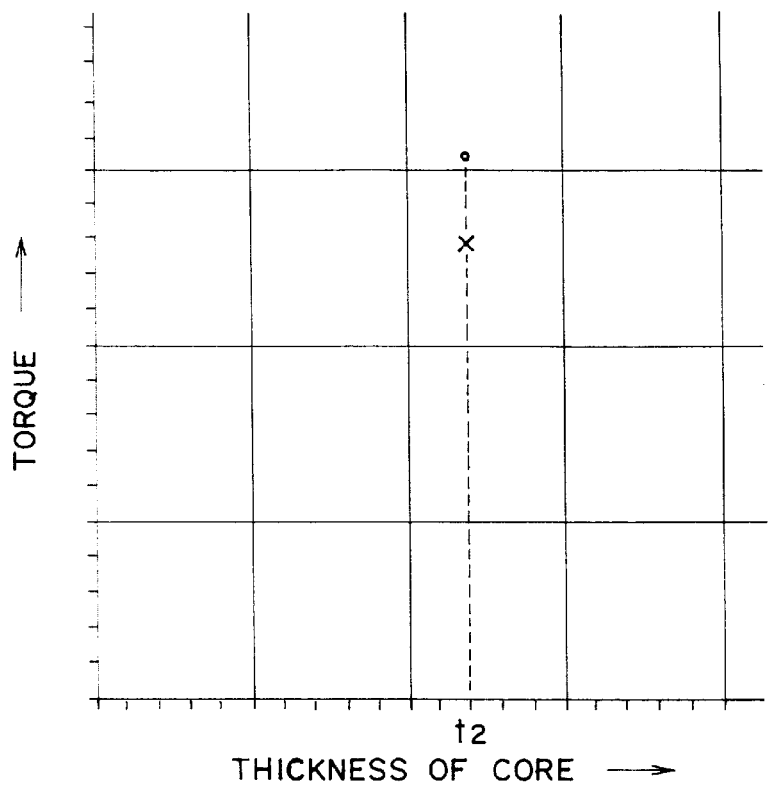
FIG. 3 is a diagram comparing output torque values between an eddy-current cylinder embodying the present invention and the conventional type of the eddy-current cylinder.

FIG. 3 is a diagram comparing output torque values between an eddy-current cylinder embodying the present invention and an eddy-current cylinder of a conventional type.

In FIG. 3, mark ○ represents the initial braking torque value for the eddy-current cylinder according to the present invention, and mark X that for the eddy-current cylinder of the conventional type. The eddy-current cylinder of the present invention shown by mark ○ is of the construction shown in FIGS. 4 and 5, which will be described below.

Figure 4:
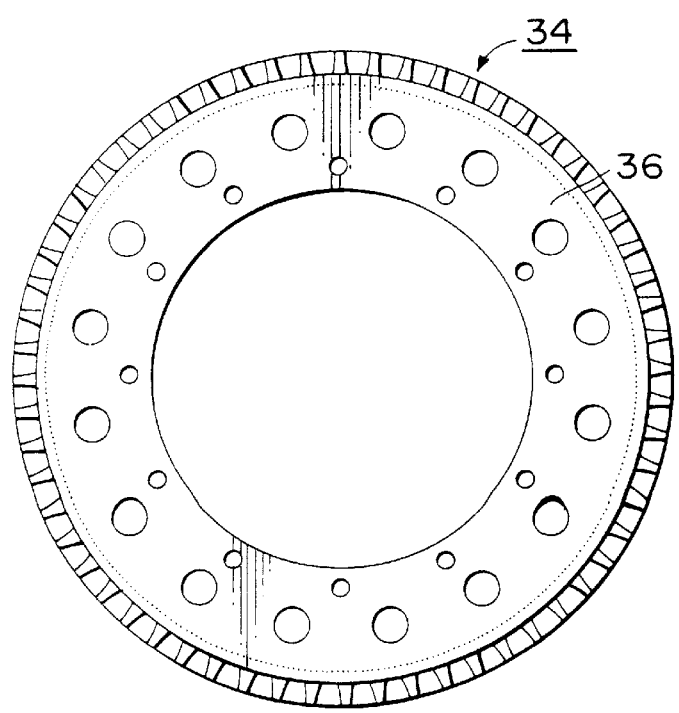
FIG. 4 is a front view of an example of the assembled eddy-current cylinder of the present invention in which a mounting cylinder is incorporated.

FIG. 4 is a front view of an assembled eddy-current cylinder embodying the present invention in which a mounting cylinder is incorporated. FIG. 5 is a partial cross-sectional view of the side part of FIG. 4. In the figures, the assembled eddy-current cylinder 34 is such that the outer circumferential surface of a mounting cylinder 36 is integrally and fixedly fitted to the inner circumferential surface of the eddy-current cylinder 20 shown in FIG. 1.

Figure 22:
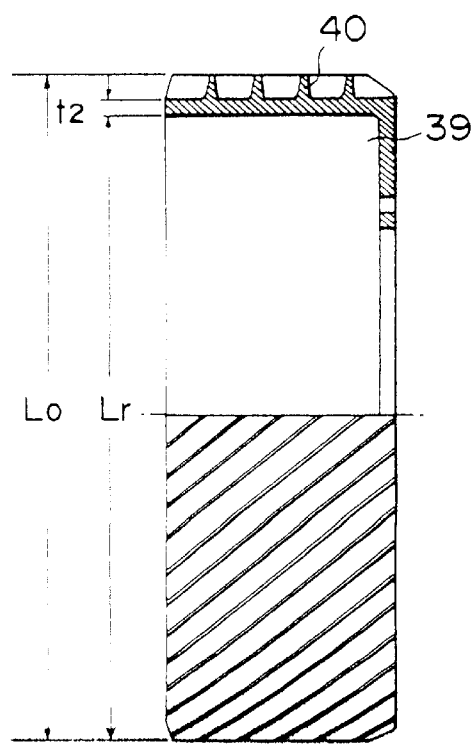
FIG. 22 is a partial cross-sectional view of the side part of FIG. 21.

The outside and inside diameters of the assembled eddy-current cylinder 34 of the present invention Lo and Lr are formed in the same size as those of the eddy-current cylinder of the conventional type shown in FIG. 22, and the thickness of the core of the assembled eddy-current cylinder 34 of the present invention is formed in the same size as the thickness t2 of the eddy-current cylinder 39 of the conventional type shown in FIG. 22.

The eddy-current cylinder of the electromagnetic retarder with a built-in exciter according to the present invention comprises a core 22 formed by helically winding a continuous strip of a magnetic material to a predetermined number of layers to form the cylinder, with one side edge of the strip having projections 23 to form radiating fins 21 when helically wound and the other side edge having a shape of straight line and facing inward, and short-circuiting means, such as a current carrying part 24 shown in FIG. 2 (A), provided on the laminated eddy-current cylinder 20 in the axial direction of the cylinder to allow the generated eddy current to flow therein, so that braking torque is improved and the manufacturing process is made easy to reduce manufacturing cost.

Figure 6:
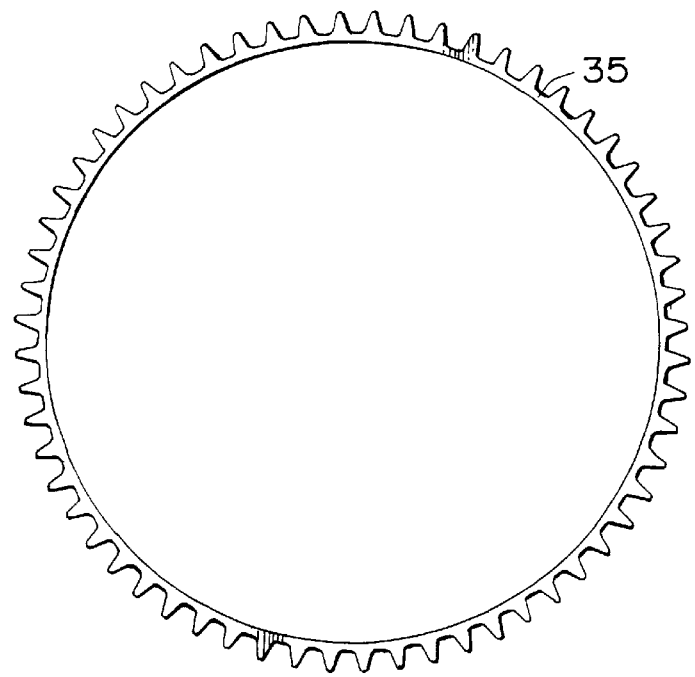
FIG. 6 is a front view of an example of a stamped core.

Although the above description is concerned with an eddy-current cylinder formed by helically winding a continuous strip of core 22, similar effects can be achieved, though manufacturing yield might be somewhat lowered, by laminating core sheets 35 that are stamped into a predetermined shape to form the eddy-current cylinder 20, as shown in FIG. 6, in place of the eddy-current cylinder 20 formed by helically winding a continuous strip of core 22.

Figure 7:
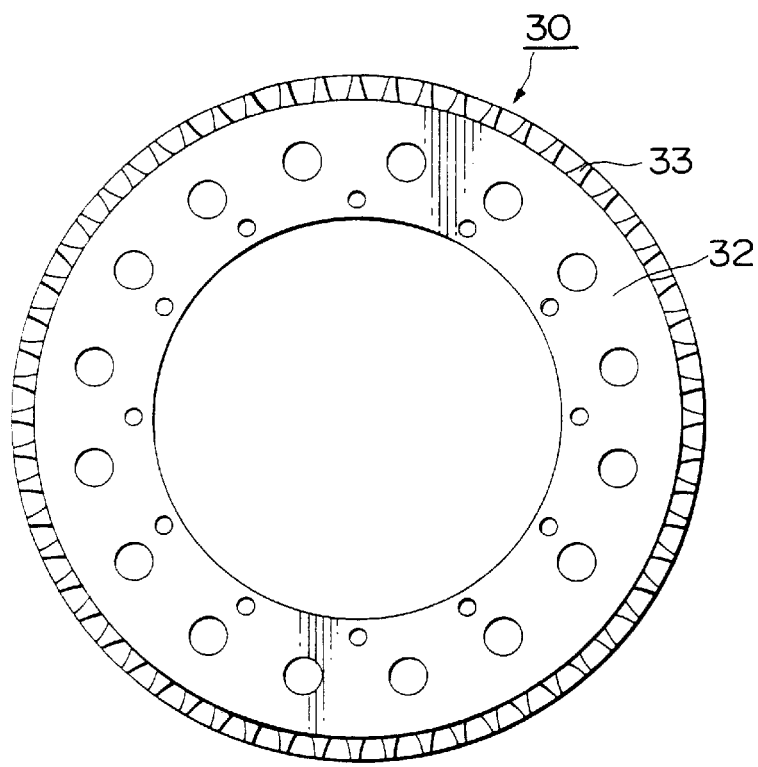
FIG. 7 is a front view of another example of the assembled eddy-current cylinder of the present invention in which a mounting cylinder is incorporated.
Figure 8:
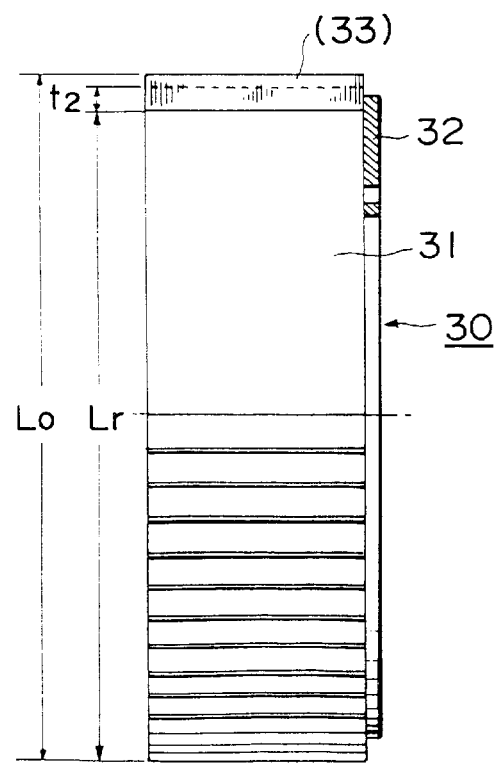
FIG. 8 is a partial cross-sectional view of the side part of FIG. 7.
Figure 9:
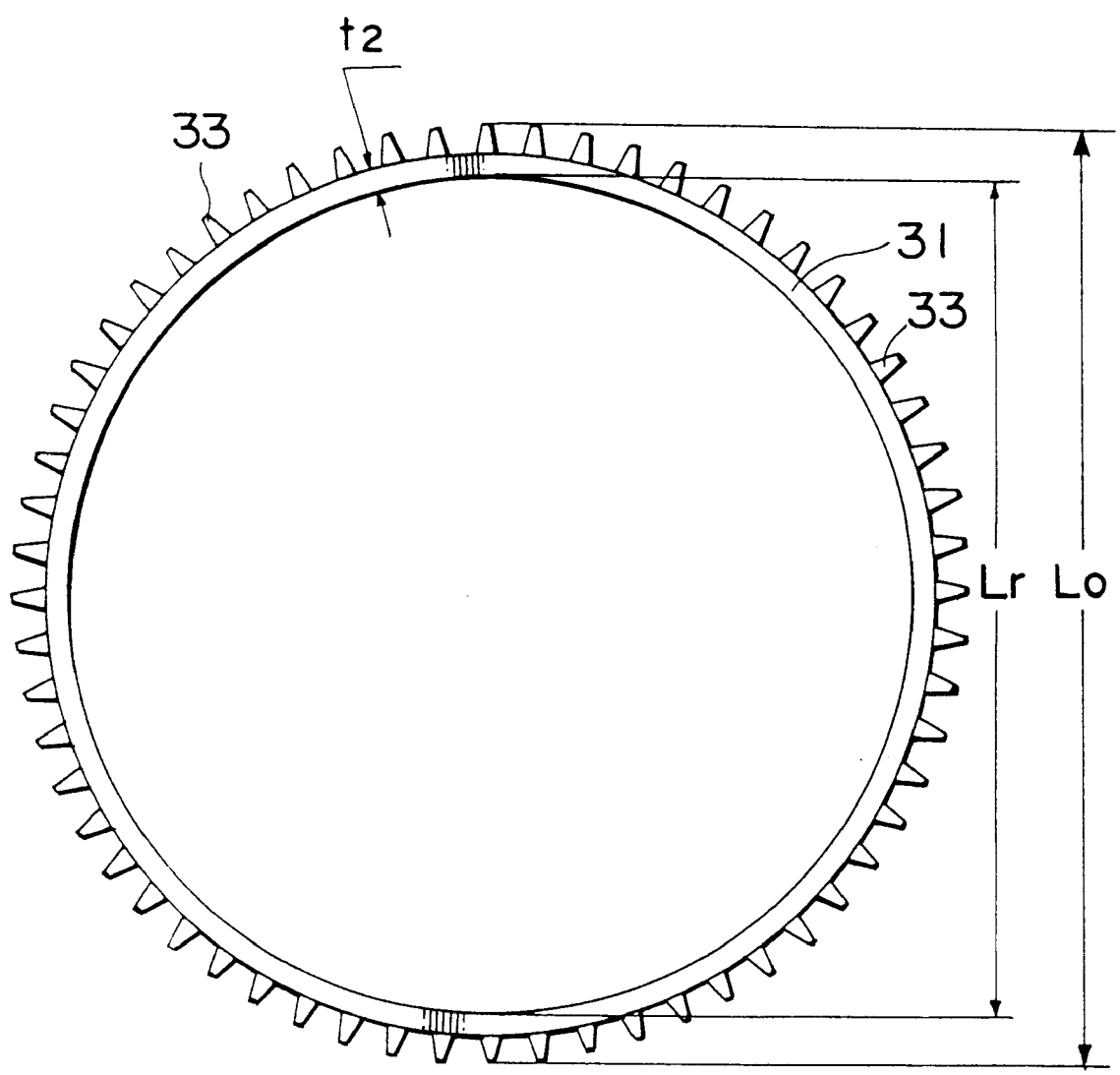
FIG. 9 is a front view showing an example of the eddy-current cylinder used in assembling the eddy-current cylinder of FIG. 7.

FIG. 7 is a front view of another example of an assembled eddy-current cylinder according to the present invention in which a mounting disc is incorporated, and FIG. 8 is a partial cross-sectional view of the side part of FIG. 7. In the figures, the assembled eddy-current cylinder 30 is such that a mounting disc 32 is welded integrally to a side of the eddy-current cylinder 31 shown in FIG. 9. The eddy-current cylinder 31 has such a construction that a predetermined number of core sheets stamped into a predetermined shape are laminated.

When the outside and inside diameters of the assembled eddy-current cylinder 30 in which the mounting disc 32 is fixedly fitted to the eddy-current cylinder 31 are Lo and Lr, respectively, (see FIG. 8), and the thickness of the core of the eddy-current cylinder 30 is formed into t2 (t2 in FIG. 8), the initial braking torque is as shown by the characteristics marked by ○ in FIG. 3. Needless to say, the assembled eddy-current cylinder 30 has short-circuiting means as shown in FIG. 2 in the laminated core constituting the eddy-current cylinder 30. Numeral 33 refers to a radiating fin.

Figure 10:
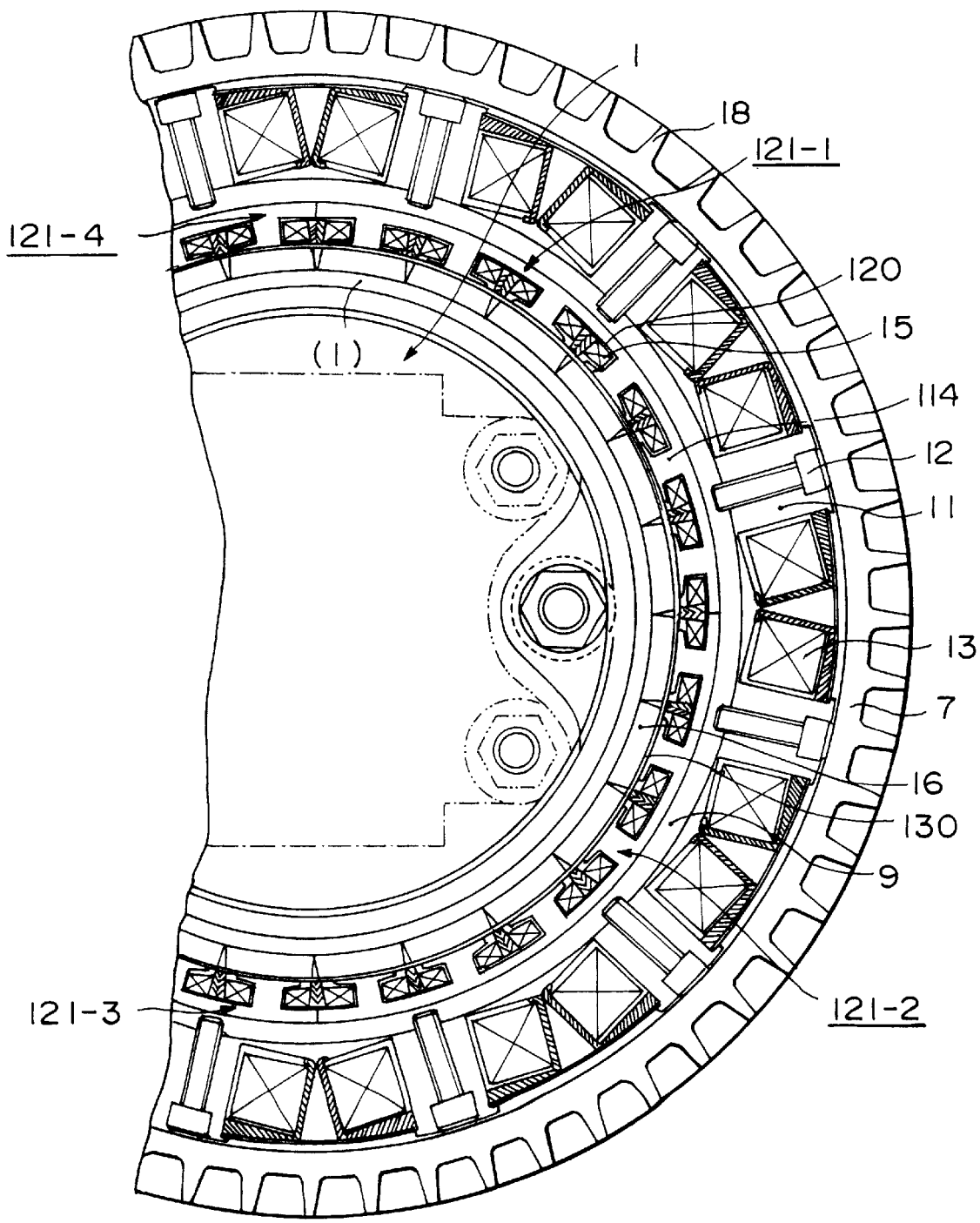
FIG. 10 is a longitudinal sectional view showing an example of the retarder with a built-in exciter in which the exciter according to the present invention is used.
Figure 11:
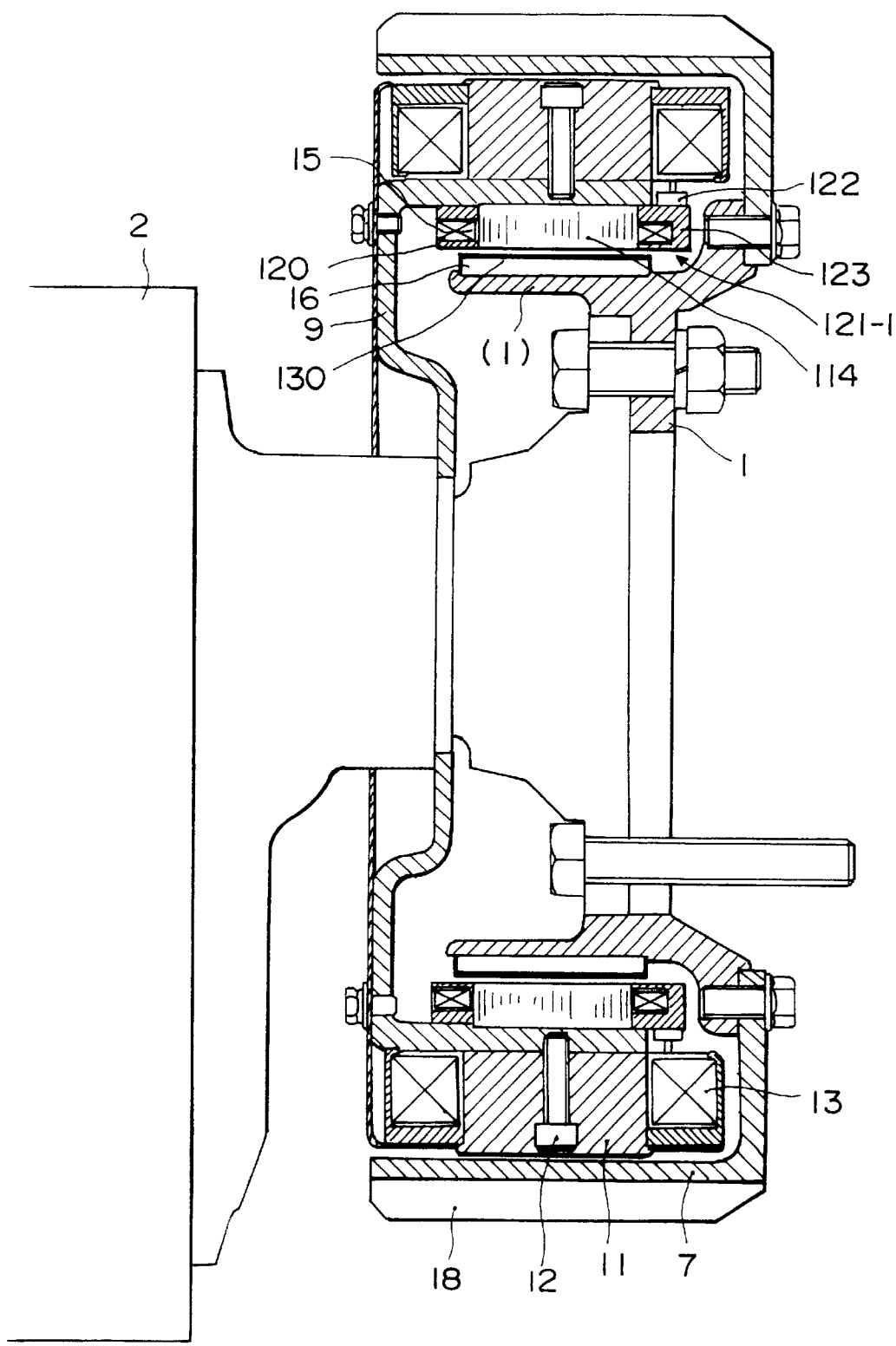
FIG. 11 is a partially cutaway longitudinal sectional view of FIG. 10 showing the essential part, partially cut away for the sake of clarity.

FIG. 10 is a partial longitudinal sectional view of an example of the retarder with a built-in exciter in which the exciter according to the present invention is used. FIG. 11 is a partially cutaway longitudinal sectional view of FIG. 10 showing the essential part.

In FIGS. 10 and 11, like parts are indicated by like numerals used in FIGS. 19 and 20. The construction of the electromagnetic retarder with a built-in exciter of FIGS. 10 and 11 is remarkably different from that of the electromagnetic retarder with a built-in exciter shown in FIGS. 19 and 20 in that the exciter core 114 is divided into four pieces; an exciter coil 15 being wound on each of the quartered exciter core pieces via a bobbin 120, and these members being molded by a molding material to form exciter cores 121-1, 121-2, 121-3 and 121-4.

As will be described in detail in FIG. 12 and thereafter, the quartered molded exciter core pieces 121-1, 121-2, 121-3 and 121-4 is such that the molded shape at both ends of the quartered molded exciter core pieces 121-1, 121-2, 121-3 and 121-4 has such a construction that the overhanging portion above the bobbin 120 with respect to the inside diameter surface of the molded exciter core is tapered toward the ends of the molded exciter core pieces 121-1, 121-2, 121-3 and 121-4; with the corner of the ends chamfered and the amount of overhang of the molding material 123 being gradually decreased, that the divided end faces at both ends of the molded exciter cores 121-1, 121-2, 121-3 and 121-4 are formed into a shape that the exciter core surface protrudes from the molded surface; the molded shape of each groove into which the exciter coil 15 wound on the bobbin 120 of the molded exciter cores 121-1, 121-2, 121-3, and 121-4 has such a construction that the overhanging portion above the bobbin 120 with respect to the inside diameter surface of the molded exciter core is tapered toward the centers of the molded exciter cores 121-1, 121-2, 121-3 and 121-4; with the amount of overhang of the molding material 123 being gradually decreased, and that both ends of the exciter coil 15 wound on the molded exciter cores 121-1, 121-2, 121-3 and 121-4 are drawn through holes on collars 122 (see FIG. 11) of a shouldered embedded construction, provided on collar mounting portions protruding from the outer circumferential surface of the molded exciter cores 121-1, 121-2, 121-3 and 121-4; with areas around the embedded portions are molded with a molding material.

In FIGS. 10 and 11, numeral 130 refers to a band for fixing permanent magnets 16 to prevent them from falling off due to centrifugal force.

All these constructions help prevent magnetic characteristics and water-proofness from deteriorating as a result of the quartering of the exciter core 114.

Figure 12:
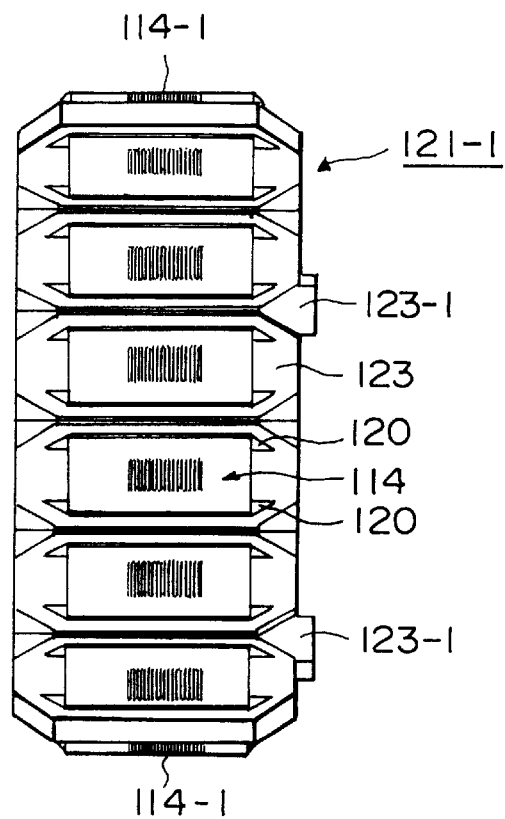
FIG. 12 is a diagram showing the molded shape of an example of the molded exciter core that is divided into four pieces.
Figure 13:
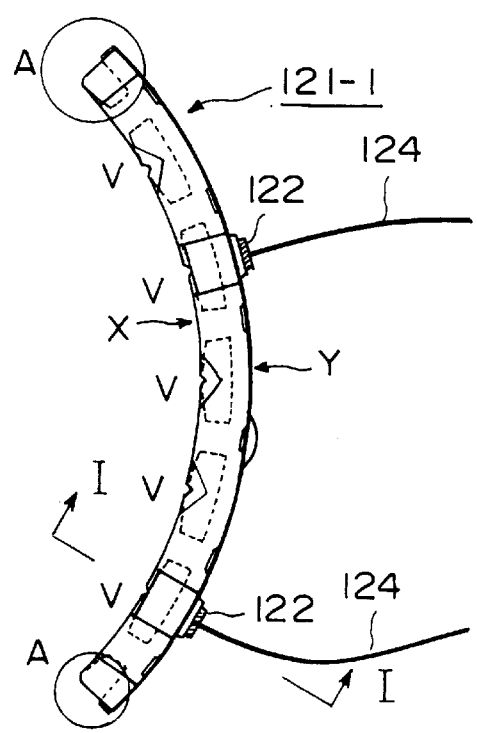
FIG. 13 is the right-hand side view of FIG. 12.
Figure 14:
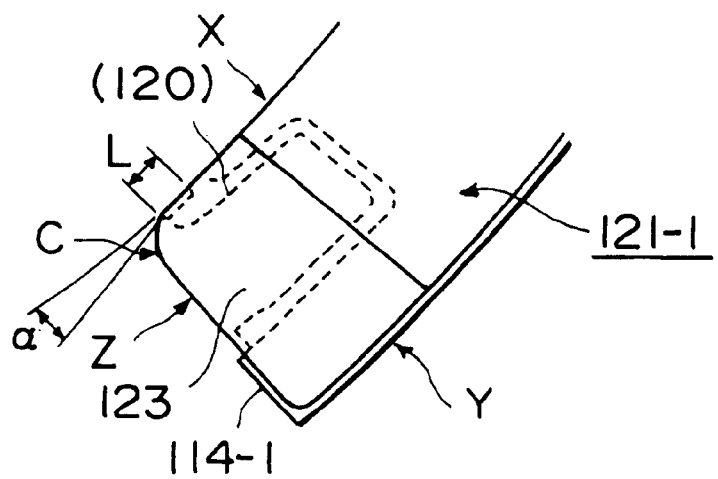
FIG. 14 is an enlarged view of the part encircled and labeled A in FIG. 13.

FIG. 12 is a diagram showing the molded shape of a quartered exciter core piece, FIG. 13 is a right-hand side view of FIG. 12, and FIG. 14 is an enlarged diagram of a portion encircled by A in FIG. 13.

In FIGS. 12 and 13, the molded exciter core 121-1 is such that an exciter core 114, s bobbin provided on each groove (corresponding to a slot) of the exciter core 114, and an exciter coil 15 (not shown in FIGS. 12 and 13) wound on the bobbin 120 provided on the exciter core 114 are molded by a molding material 123 made of a synthetic resin, such as silicone. The inside diameter surface X and the outside diameter surface Y of the exciter core 114 are exposed from the molding material 123, and the end faces 114-1 at both ends of the divided exciter core piece 114 are molded in a protruded state from the molded surface Z on the end face of the molded exciter core 121-1, as shown in FIG. 14 which is an enlarged diagram of a portion encircled by A in FIG. 13.

The molded shape at both ends of the molded exciter core 121-1 is such that the overhanging portion of the molding material 123 above the bobbin 120, that is, a portion L shown in FIG. 14 is molded in the state of tapering toward the end of the molded exciter core 121-1 (by angle $\alpha$ with respect to the inside diameter surface X of the molded exciter core 121-1); with the corner portion C extending to the tapered portion L being chamfered.

Figure 15:
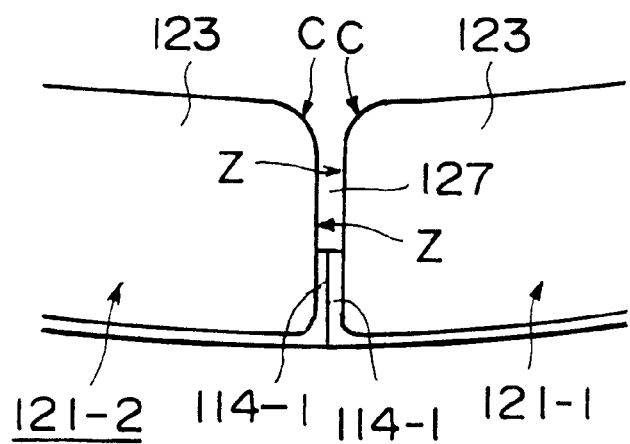
FIG. 15 is a diagram of assistance in explaining the assembled state of the divided parts.

As a result, when the molded exciter cores 121-1, 121-2, 121-3 and 121-4 are assembled into a cylindrical shape, as shown in FIG. 10, a gap 127 is formed between the molded exciter cores 121-1 and 121-2 as the end faces 114-1 of the exciter cores 114 protruding from the molded surfaces Z butt against each other, as shown in FIG. 15 which is a diagram of assistance in explaining the assembled state of the divided molded exciter core pieces. As a result of the gap 127 formed between the molded exciter cores 121-1 and 121-2, the molded exciter cores 121-1, 121-2, 121-3 and 121-4 can be easily press-fitted into the cylindrical yoke of a support plate 9. Furthermore, the magnetic resistance of the magnetic path can be prevented from increasing and performance can be maintained since the molded exciter cores 121-1, 121-2, 121-3 and 121-4 can be press-fitted without no gap between the end faces 114-1 thereof.

The gap 127 serves as a relief for the thermal expansion of the molding material 123 to prevent the mutual interference of the molding materials of the molded exciter cores 121-1 and 121-2.

In FIG. 13, numeral 124 denotes a lead wire of the exciter coil 15; the lead wires 124 from the both ends of the exciter coil 15 wound on the bobbin 120 are drawn out of a collar 122. The collar 122 is mounted on a collar mount 123-1 formed in the state of protruding from the outer circumferential surface of the molded exciter core 121 shown in FIG. 10 in the axial direction. The construction of the collar 122 will be described in detail later, referring to FIG. 18.

Figure 16:
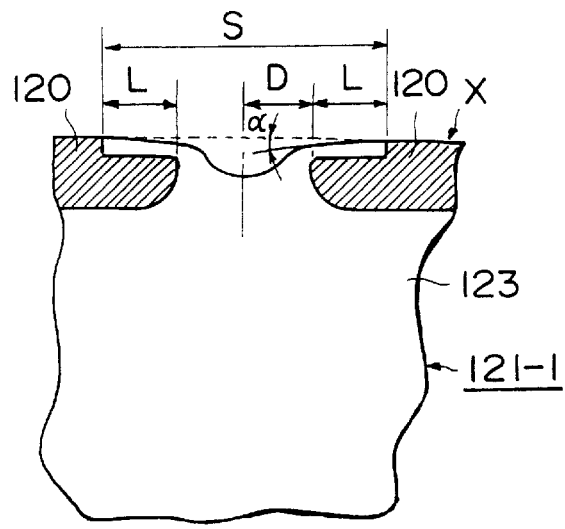
FIG. 16 is an enlarged cross-sectional view of an example of each groove of the molded exciter core.

FIG. 16 is an enlarged cross-sectional view of an example of a groove portion (corresponding to a slot) of the molded exciter core.

The molded shape of a groove width S of the molded exciter core 121-1 is such that the overhanging portion of the molding material 123 above the bobbin 120 is formed in the state of tapering toward the center of the groove width S with respect to the inside diameter surface X of the molded exciter core 121-1; with the amount of overhang being gradually decreased. That is, the molded shape of the groove width S portion at the exciter-coil insertion hole of the molded exciter core 121-1 is formed symmetrically with respect to the center of the groove width S. Now, let us discuss one side of the groove width S portion. The overhanging portion of the molding material 123 above the bobbin 120, that is, the portion L shown in FIG. 16 is molded in the state of tapering toward the center of the groove width S of the molded exciter core 121-1 (by angle $\alpha$ with respect to the inside diameter surface X of the molded exciter core 121-1), and the center portion D extending to the tapered portion L is formed into a recess.

Figure 17:
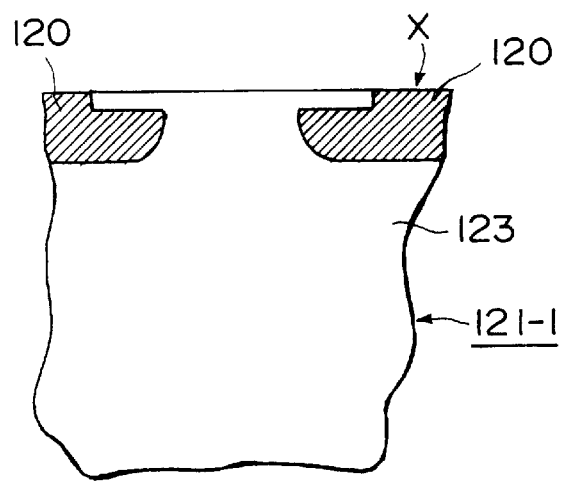
FIG. 17 is a diagram of assistance in explaining the shape of the thermally expanded molded part around the groove.

FIG. 17 is a diagram of assistance in explaining the shape of the molding material on the groove portion when it is expanded by heat.

When the molding material 123 is formed as shown in FIG. 16, the molded shape of the groove width S portion at the exciter-coil insertion hole of the molded exciter core 121-1 is deformed by the thermal expansion of the molding material 123, that is, the inside diameter surface X is deformed as shown by solid lines in FIG. 17.

The molded shape of the groove width S portion at the exciter-coil insertion hole of the molded exciter core 121-1 shown in FIG. 16 is formed at five locations shown by V in FIG. 13.

Figure 18:
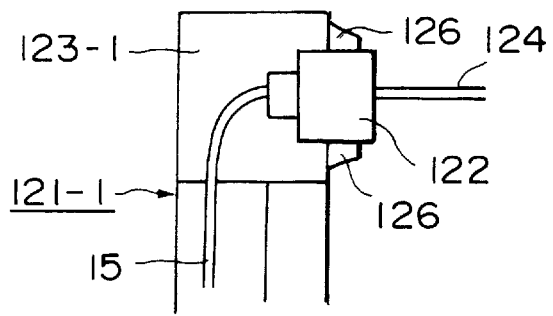
FIG. 18 is a cross-sectional view of the collar mounting portion, viewed in the direction shown by the arrows I—I of FIG. 13.

FIG. 18 is a partial cross-sectional view of the portion where the collar is mounted, viewed in the direction shown by arrows I—I in FIG. 13.

The lead wire 124 of the exciter coil 15 wound on the molded exciter core 121-1 is drawn out of the hole of the collar 122 mounted on the collar mounting portion 123-1 of a shouldered embedded construction, protruding from the outer circumferential surface of the molded exciter core 121-1 in the axial direction. Areas around the embedded portion of the collar 122 are molded in a built-up state by a molding material 126, as shown in FIG. 18.

Since the collar 122 has a shouldered embedded construction, and areas around the molded portion of the collar 122 are molded in a built-up state by the molding material 126, the lead wires 124 at both ends of the exciter coil 15 can be moved freely, and even when the movement of the lead wires 124 is transmitted to the collar 122, the shouldered embedded construction of the collar 122 and the built-up molding material 126 prevent the collar 122 from falling off, thereby maintaining water-proofness.

As described above, the present invention makes it possible to improve braking torque characteristics, easily manufacture an eddy-current cylinder, and therefore reduce manufacturing cost by adopting the construction where the eddy-current cylinder is formed by laminating a magnetic material and short-circuiting means are provided inside the cylinder to allow eddy current to flow therein.

The yield of the magnetic material can be improved and manufacturing cost can be further reduced by using a method for manufacturing the eddy-current cylinder with radiating fins by helically winding a continuous strip of a magnetic material with one side edge thereof having projections to form radiating fins when helically wound and the other side edge formed into a straight-line shape.

By adopting a construction in which the exciter core of the electromagnetic retarder with a built-in exciter is divided into a plurality of pieces, and the adverse effect of the increase in the magnetic resistance of the magnetic path resulting from the division of the exciter core on performance, and deterioration of water-proofness can be prevented, the exciter core can be divided into a plurality of pieces and a retarder exciter having good water-proofness can be achieved. Division of the exciter core into a plurality of pieces helps improve material yield.

What is claimed is:

1. An electromagnetic retarder with a built-in exciter comprising a built-in exciter for retarders, a plurality of magnetic poles that are magnetized alternately to N and S poles by a field current fed on the basis of a voltage generated by said exciter, and an eddy-current cylinder provided at a location facing said magnetic poles; said eddy-current cylinder being rotated relatively with said magnetic poles to generate eddy current thereby generating a braking torque, wherein said exciter comprises:

an exciter coil wound on bobbins facing a plurality of permanent magnets via an air gap, and a cylindrical exciter core, said cylindrical exciter core being divided into a plurality of pieces to from a molded exciter core and said molded exciter core being molded with a molding material provided integrally with said bobbins and said exciter coil and covering said bobbins, said molded exciter core having a shape with an overhanging portion of the molding material covering the bobbin tapered toward the end portion of the molded exciter core with respect to an inside diameter surface of the molded exciter core, with a corner of the end portion being chamfered and the amount of overhang being gradually decreased;

end faces at each end of said molded exciter core formed so that the exciter core surface protrudes from the molded surface of said molded exciter core;

a groove width portion formed corresponding to an exciter coil insertion hole of the respective bobbins in the molded exciter core with respect to the inside diameter surface of the molded exciter core;

the overhanging portions of the molding materials covering the bobbins tapered toward the center of said groove width portion so that the amount of overhang is gradually decreased;

each end of said exciter coil wound on said molded exciter core are drawn through a collar defining a hole, of a shouldered embedded construction, mounted on a collar mount protruding from the outer circumferential surface of said molded exciter core in the axial direction;

areas around the embedded part of said collar being molded by a molding material.

2. An electromagnetic retarder with a built-in exciter comprising a built-in exciter for retarders, a plurality of magnetic poles that are magnetized alternately to N and S poles by a field current fed on the basis of a voltage generated by said exciter and an eddy-current cylinder provided at a location facing said magnetic poles said eddy-current cylinder being rotated relatively with said material poles to generate eddy current thereby generating braking torque, wherein said eddy-current cylinder comprises:

a core formed by laminating a magnetic material, and short-circuiting means for allowing said generated eddy current to flow therein provided on said laminated core in the axial direction of said eddy-current cylinder, said exciter comprises:

an exciter coil wound on bobbins facing a plurality of permanent magnets via an air gap, and a cylindrical exciter core;

said cylindrical exciter core being divided into a plurality of pieces to form a molded exciter core and said molded exciter core being molded with a molding material provided integrally with said bobbins and covering said bobbins, said molded exciter core having a shape with an overhanging portion of the molding material covering the bobbin tapered toward the end portion of the molded exciter core with respect to the inside diameter surface of the molded exciter core;

a corner of the end portion being chamfered and the amount of the overhang being gradually decreased;

end faces at each end of said molded exciter core formed so that the exciter core surface protrudes from the molded surface of said molded exciter core;

a groove width portion formed corresponding to an exciter coil insertion hole of the respective bobbins in the molded exciter core with respect to the inside diameter surface of the molded exciter core;

the overhanging portion of the molding material covering the bobbins tapered toward the center of said groove width portion so that the amount of overhang is gradually decreased; and each end of said exciter coil wound on said molded exciter core are drawn through a collar defining a hole, of a shouldered embedded construction, mounted on a collar mount protruding from the outer circumferential surface of said molded exciter core in the axial direction; areas around the embedded part of said collar being molded by a molding material.

3. An electromagnetic retarder with a built-in exciter, comprising:

a support disc with a plurality of permanent magnets on an outer periphery of said disc;

a support plate with a pole core with a plurality of a plurality of magnetic poles said magnetic poles having field current flow therein upon application of a voltage generated in the exciter to magnetize the magnetic poles alternately to north and south poles;

an eddy-current cylinder provided at a location facing said magnetic poles and connected to said support disc for rotating relative to said pole core, said eddy current cylinder comprising a laminated continuously stamped strip of magnetic material having a predetermined shape, said material forming a predetermined number of layers to form said cylinder, said cylinder having an outer surface and having a short circuiting current carrying part extending in an axial direction of said cylinder for said eddy current to flow within said cylinder for generating a braking torque by said eddy-current cylinder when an eddy current is created by said eddy-current cylinder being rotated relative to said magnetic poles;

an exciter core assembly connected to said support plate and supplying voltage to said pole core, said exciter core assembly comprising a plurality of molded exciter cores, each of said exciter cores including a plurality of exciter cores, a plurality of bobbins, and a plurality of exciter coils, with each of said bobbins having an exciter coil wound on the bobbin provided on the exciter core, and including a molding material wherein each of said molded exciter cores is formed integrally molded with said exciter cores, said exciter coils and said bobbins joined by said molding material, said molding material covering each of said bobbins to define overhanging portions of said molding material covering each of said bobbins, said overhanging portion formed at an end portion of each said molded exciter core being tapered toward an end portion of said molded exciter core with respect to an inside diameter surface of said molded exciter core, said overhanging portion covering each of said bobbins formed corresponding to an exciter insertion hole being tapered toward a center of a grooved width portion with respect to an inside diameter surface of the molded exciter core with said overhang portion so that amount of overhang is gradually decreased.

4. An electromagnetic retarder with a built-in exciter according to claim 3, wherein said molded exciter core comprises:

a corner of said end portion being chamfered and the amount of said overhang is gradually decreased;

end faces at each end of said molded exciter core formed so that a surface of said exciter core protrudes from a molded surface of said molded exciter core;

a grooved width portion proximate to an exciter coil insertion hole of said bobbin of said molded exciter core wherein said molded exciter core is formed by laminating a magnetic material;

a collar disposed proximate to said wound exciter coil wherein said collar is attached to a collar mount.

5. The electromagnetic retarder with a built-in exciter of claim 3, wherein said short-circuiting carrying part is a plurality of rivets.

* * * * *